US009132971B2

(12) United States Patent
Overly et al.

(10) Patent No.: US 9,132,971 B2
(45) Date of Patent: Sep. 15, 2015

(54) METHODS OF TRANSPORTING PRODUCTS AND PACKAGES OF PRODUCTS MADE THEREFROM (71) Applicant: The Procter & Gamble Company, Cincinnati, OH (US)

(72) Inventors: Matthew Bernard Overly, Deerfield Township, OH (US); Wesley Bernard Brokopp, Jr., Middletown, OH (US); Joseph Clifford Noll, Cincinnati, OH (US); Jeffrey Dean Hartline, Petersburg, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 58 days.

(21) Appl. No.: 13/916,756

(22) Filed: Jun. 13, 2013

(65) Prior Publication Data
US 2013/0334008 A1 Dec. 19, 2013

Related U.S. Application Data (60) Provisional application No. 61/659,485, filed on Jun. 14, 2012.

(51) Int. Cl.
*B65G 47/26* (2006.01)
*B65G 47/30* (2006.01)
(Continued)

(52) U.S. Cl.
CPC .............. *B65G 47/30* (2013.01); *B65B 25/146* (2013.01); *B65B 35/16* (2013.01); *B65B 35/243* (2013.01); *B65B 35/44* (2013.01); *B65B 35/50* (2013.01); *B65D 71/063* (2013.01); *B65D 75/006* (2013.01); *B65G 15/14* (2013.01); *B65G 2201/0232* (2013.01)

(58) Field of Classification Search
CPC .................. B65G 47/30; B65G 15/14; B65G 2201/0232; B65B 35/243; B65B 35/50; B65B 35/44; B65B 35/16
USPC .......................... 198/418, 817, 383, 389, 617
See application file for complete search history.

(56) References Cited

U.S. PATENT DOCUMENTS 1,252,681 A 1/1918 Friess
1,877,269 A 9/1932 Colgren
(Continued)

FOREIGN PATENT DOCUMENTS

DE 10 2009 025824 A1 11/2010
EP 1 223 126 B1 1/2002
(Continued)

OTHER PUBLICATIONS

U.S. Appl. No. 13/916,756, International Search Report mailed Oct. 7, 2013.
(Continued)

*Primary Examiner* — William R Harp
(74) *Attorney, Agent, or Firm* — Roddy M. Bullock (57) ABSTRACT

The present disclosure is directed, in part, to a method of transporting products. The method comprises providing a V-shaped conveying mechanism and positioning a plurality of the products on the V-shaped conveying mechanism such that a first portion of the plurality of the products engages a first side of the V-shaped conveying mechanism, and such that a second portion of the plurality of the products engages a second side of the V-shaped conveying mechanism.

14 Claims, 9 Drawing Sheets (51) Int. Cl.
 *B65D 75/00* (2006.01)
 *B65D 71/06* (2006.01)
 *B65G 15/14* (2006.01)
 *B65B 25/14* (2006.01)
 *B65B 35/16* (2006.01)
 *B65B 35/24* (2006.01)
 *B65B 35/44* (2006.01)
 *B65B 35/50* (2006.01)

(56) References Cited

U.S. PATENT DOCUMENTS

| | | |
|---|---|---|
| 2,813,617 A | 11/1957 | Sheetz |
| 3,050,174 A | 8/1962 | Billett |
| 4,430,844 A | 2/1984 | James |
| 4,433,774 A | 2/1984 | Lopes |
| 4,557,341 A | 12/1985 | Soderholm |
| 4,572,760 A | 2/1986 | Marchetti |
| 4,679,379 A | 7/1987 | Cassoli |
| 4,747,480 A | 5/1988 | Wedler et al. |
| 5,213,198 A | 5/1993 | Kovacs |
| 5,228,572 A | 7/1993 | Hendriks |
| 5,255,495 A | 10/1993 | Kovacs |
| 5,301,793 A | 4/1994 | Kovacs |
| 5,365,721 A | 11/1994 | Focke |
| 5,377,478 A | 1/1995 | Kovacs et al. |
| 5,433,063 A | 7/1995 | Kovacs et al. |
| 5,447,012 A | 9/1995 | Kovacs et al. |
| 5,533,609 A | 7/1996 | Hulse |
| 6,484,475 B1 | 11/2002 | Neagle et al. |
| 6,574,520 B1 | 6/2003 | Liu et al. |
| 6,817,604 B2 | 11/2004 | Ohlmann et al. |
| 6,854,242 B2 | 2/2005 | Stork et al. |
| 6,938,393 B2 | 9/2005 | Timmerman et al. |
| 6,990,715 B2 | 1/2006 | Liu et al. |
| 7,014,032 B2 | 3/2006 | Franzaroli |
| 7,104,031 B2 | 9/2006 | Baggot et al. |
| 7,114,609 B2 | 10/2006 | Christman et al. |
| 7,174,697 B2 | 2/2007 | Hada et al. |
| 7,311,191 B2 | 12/2007 | Bahr |
| 7,325,374 B2 | 2/2008 | Chrisman et al. |
| 7,506,486 B2 | 3/2009 | Wegner et al. |
| 7,684,889 B2 | 3/2010 | Focke |
| 7,793,773 B2 | 9/2010 | Beck et al. |
| 8,061,503 B2 | 11/2011 | Ancarani |
| 8,973,740 B2 * | 3/2015 | Overley et al. ............... 198/617 |
| 2004/0144618 A1 | 7/2004 | McDonald et al. |
| 2005/0173227 A1 | 8/2005 | Adamski |
| 2006/0175179 A1 | 8/2006 | Christman et al. |
| 2009/0277745 A1 | 11/2009 | Spangler et al. |
| 2010/0147651 A1 | 6/2010 | Ancarani |
| 2011/0046772 A1 | 2/2011 | Healey et al. |
| 2012/0318954 A1 | 12/2012 | Overley et al. |
| 2012/0321429 A1 | 12/2012 | Overley et al. |

FOREIGN PATENT DOCUMENTS

| | | |
|---|---|---|
| EP | 1 344 730 A1 | 9/2003 |
| EP | 1 791 757 B1 | 8/2008 |
| FR | 2 725 704 A1 | 4/1996 |

OTHER PUBLICATIONS

All Office Actions in U.S. Appl. No. 13/517,686 and U.S. Appl. No. 13/517,695.

* cited by examiner

METHODS OF TRANSPORTING PRODUCTS AND PACKAGES OF PRODUCTS MADE THEREFROM

FIELD

The present disclosure generally relates to methods of transporting products and, more particularly, relates to methods of transporting products and packages of products made therefrom.

BACKGROUND

Wrapped or unwrapped rolled products or cylindrical, or generally cylindrical (herein "cylindrical), products, such as rolls of paper towels, shop towels, toilet tissue, or cylindrical containers of products, for example, or stacks or groups thereof, are hard to control during a manufacturing and/or a packing operation when they are resting on their sides (i.e., a longitudinal axis of the rolled or cylindrical products extends in a direction generally parallel to a surface on which they are resting) owing to the round or substantially round outer surface of the rolled or cylindrical products. To obtain control of the rolled or cylindrical products, it is desirable to control them from at least three sides to inhibit them rolling. Stacking or grouping rolled or cylindrical products may also be cumbersome since the rolled or cylindrical products have a tendency to roll relative to each other, especially when placed on top of each other. Some rolled or cylindrical products may typically be packaged into packages that are generally square or rectangular in shape. As such, the rolled or cylindrical products are usually conveyed into a packaging operation, such as a cartoning operation, a case packing operation, a wrapping or shrinkwrapping operation, or a bundling operation, for example, in this form when they are resting on their rounded sides. A generally rectangular or square grouping of rolled or cylindrical products, however, needs to be supported on at least three sides, to maintain this configuration. Without this support, the generally rectangular or square grouping will fall apart owing to the round outer surface of the sides of the rolled or cylindrical products. The grouping of the rolled or cylindrical products may have multiple rows, columns, and/or layers which require support. What is needed are methods of transporting rolled or cylindrical products in a stack or a grouping where the rolled or cylindrical products have greater stability and require support on less than three sides.

SUMMARY

In one form, the present disclosure is directed, in part, to a method of transporting products. The method comprises providing a V-shaped conveying mechanism and positioning a plurality of the products on the V-shaped conveying mechanism. A first portion of the plurality of the products engages a first side of the V-shaped conveying mechanism and a second portion of the plurality of the products engages a second side of the V-shaped conveying mechanism. A third portion of the plurality of products may only engage other products and may not engage the V-shaped conveying mechanism. The products may be rolled or cylindrical products. Alternatively, the products may be any shape suitable for being transported on a V-shaped conveying mechanism.

In another form, the present disclosure is directed, in part, to method of transporting products. The method comprises providing a V-shaped conveying mechanism, positioning a plurality of the products on the V-shaped conveying mechanism in a group, and transporting the group of the plurality of the products between a first position and a second position using the V-shaped conveying mechanism.

In still another form, the present disclosure is directed, in part, to a method of transporting a group of products, wherein the group of products can comprise rolled products. The method comprises providing a conveying mechanism comprising a first conveyor and a second conveyor. The first conveyor defines a first axis extending in a direction generally perpendicular to a direction of movement of the group of the rolled products on the conveying mechanism. The second conveyor defines a second axis extending in a direction generally perpendicular to the direction of movement of the group of products on the conveying mechanism. The first axis extends in a direction that is transverse or generally perpendicular to the direction of extension of the second axis. The method further comprises engaging a first portion of a first rolled product with the first conveyor, engaging a second portion of the first product with the second conveyor, and engaging a second product with a third portion of the first product and with the first conveyor or the second conveyor.

In yet another form, the present disclosure is directed, in part, to a package of products. The package comprises a film or other material wrapper surrounding a plurality of products. The package also comprises at least one wall, such as a side wall, a bottom wall, or a top wall, for example, having a diamond-like shape, at least one wall having a parallelogram-like shape, at least one wall having a trapezoidal-like shape, or at least one wall having a pentagonal-like shape.

BRIEF DESCRIPTION OF THE DRAWINGS

The above-mentioned and other features and advantages of the present disclosure, and the manner of attaining them, will become more apparent and the disclosure itself will be better understood by reference to the following description of non-limiting embodiments of the disclosure taken in conjunction with the accompanying drawings, wherein.

DETAILED DESCRIPTION

Some non-limiting embodiments of the present disclosure will now be described to provide an overall understanding of the principles of the structure, function, manufacture, and use of the methods from transporting products and packages of products made therefrom disclosed herein. One or more examples of these non-limiting embodiments are illustrated in the accompanying drawings. Those of ordinary skill in the art will understand that the methods for transporting products and packages of products made therefrom described herein and illustrated in the accompanying drawings are non-limiting example embodiments and that the scope of the various non-limiting embodiments of the present disclosure are defined solely by the claims. The features illustrated or described in connection with one non-limiting embodiment may be combined with the features of other non-limiting embodiments. Such modifications and variations are intended to be included within the scope of the present disclosure.

Owing to the rounded side walls of rolled and cylindrical products, it may be desirable to transport, convey, and/or move such products using a V-shaped conveyor or conveying mechanism. The V-shaped conveying mechanism may allow the rolled or cylindrical products to be stacked or grouped while maintaining control of the rolled or cylindrical products by using as few as two surfaces or conveyors. Traditionally, rolled or cylindrical products that are grouped or stacked require three sides of the group or stack to be supported to maintain the grouped or stacked configuration (e.g., a grouped or stacked configuration formed into a cubic shape). This is due to the rounded nature of the side walls of the rolled or cylindrical products. The V-shaped conveying mechanism of the present disclosure overcomes the disadvantages of the related rolled or cylindrical product transporting methods, namely using at least three support surfaces to maintain control of the rolled or cylindrical products, and adjusting the equipment each time different sizes of rolls and/or numbers of rolls are being processed.

The V-shaped conveying mechanism of the present disclosure may be quite useful in transporting rolled or cylindrical products, owing to the inherent stability that the rolled or cylindrical products have while stacked in a V-shaped conveying mechanism. Stated another way, the rolled or cylindrical products have a reduced tendency to roll while stacked in the V-shaped conveying mechanism. This stability may be provided, at least in part, by supporting the rolled or cylindrical products from two sides with the V-shaped conveying mechanism and through gravity acting on the stack of rolled or cylindrical products. Stacks of rolled or cylindrical products in a diamond-like shape or a rhombus-like shape may have more stability than a cube-shaped or rectangular-shaped stack of rolled or cylindrical products. As such, by using a V-shaped conveying mechanism, better control of rolled products may be achieved and, thereby, more efficient processing or packaging of the rolled or cylindrical products is provided.

The "rolled products" of the present disclosure may be rolls of paper towels, rolls of fibrous substrates, rolls of toilet tissues, rolls of wipes, rolls of shop towels, rolls of paper products, rolls of nonwoven products, rolls of plastic bags, and/or rolls of films (e.g., plastic wrap), for example. The rolled products may also comprise rolls of any other suitable products.

The "cylindrical products" of the present disclosure may be rolled or non-rolled products, such as generally cylindrical products or containers of products, such as batteries and cans of PRINGLES®, for example.

In other embodiments, the products of the present disclosure may not be rolled or cylindrical products and instead may comprise boxes, cartons, bags, packs, containers, pouches, bottles, facial tissue packs, facial tissue boxes, bags or packs of dishwasher pouches, bags or packs of laundry detergent pouches, bags, packs, or containers of any other suitable products, boxes or pouches of toothpaste or beauty care products, such as hair care products, packages of rolled products, such as paper towels, shop towels, or toilet tissues, boxes or containers of wet or dry wipes, boxes of diapers, tampons, or sanitary napkin pads, packages of napkins, and/or stackable bottles or containers, for example. This list of products is not to be limiting and any other suitable products or intermediate products may be used with the V-shaped conveying mechanism of the present disclosure.

Although, "rolled products" are referred to throughout the disclosure as an example embodiment, it is to be understood the present disclosure is not limited to such. In fact, the present disclosure may encompass conveying any suitable product of any size and shape using the V-shaped conveying mechanism.

Figures 1, 2:
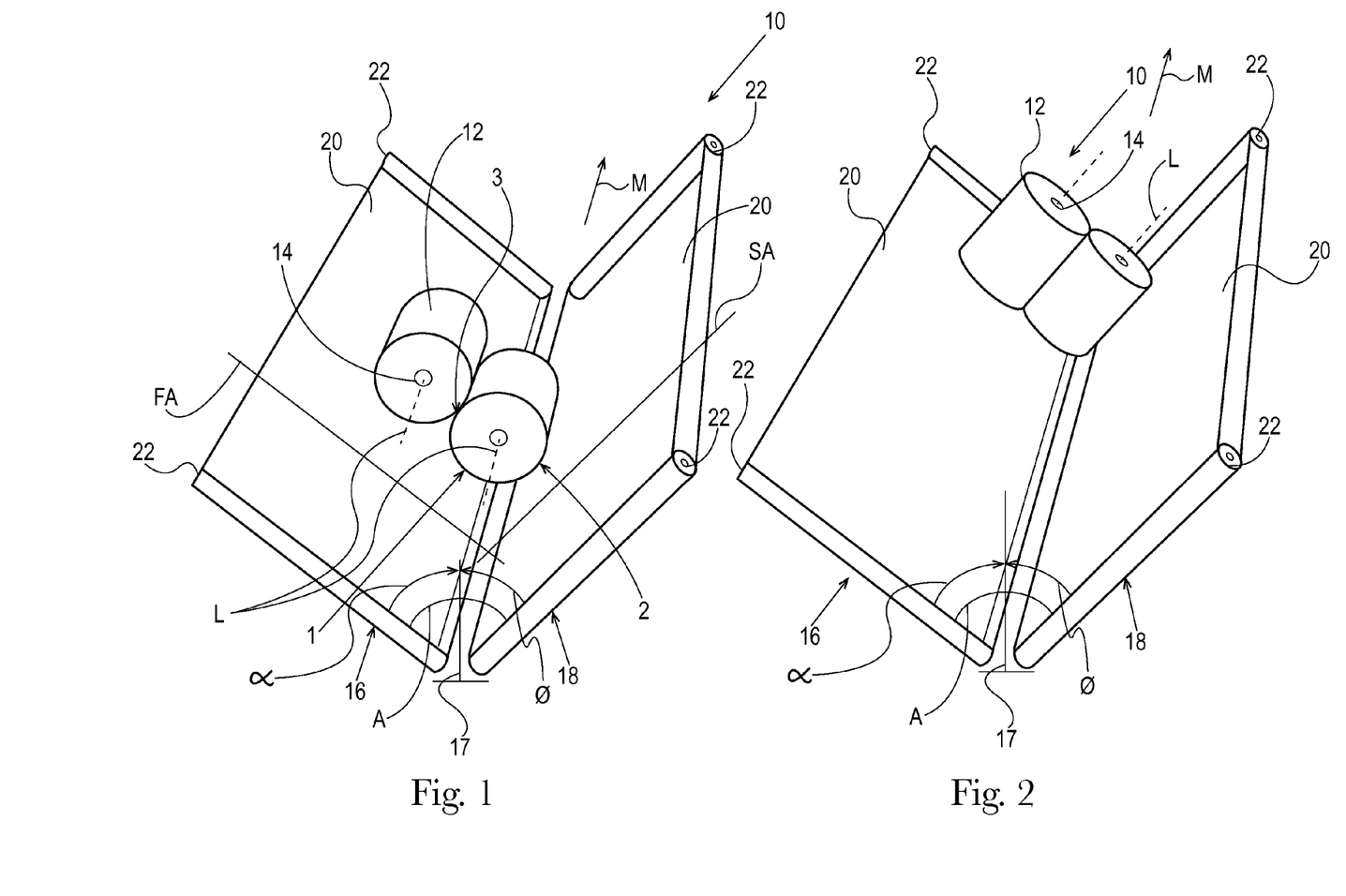
FIG. 1 is a perspective view of a V-shaped conveying mechanism having two rolled products positioned thereon in a first configuration in accordance with a non-limiting embodiment.
FIG. 2 is another perspective view of the V-shaped conveying mechanism of FIG. 1 having two rolled products positioned thereon in a second configuration in accordance with a non-limiting embodiment.

In an embodiment, referring to FIGS. 1 and 2, a V-shaped conveying mechanism 10 is illustrated with a plurality of rolled products 12 positioned thereon. One advantage of the V-shaped conveying mechanism 10 is that it does not require a lot of complex adjustable support members in the form of conveyors or guiderails, for example. The V-shaped conveying mechanism 10 may be used to transport, convey, and/or move one or more rolled products 12 from a first position to a second position or from a first location to a second location. The rolled product 12 is positioned in a first configuration in FIG. 1 and in a second configuration in FIG. 2. Each of the rolled products 12 may have a core or aperture 14 (e.g., coreless rolls that define an aperture in the rolled products) (hereafter, rolled products with cores and "coreless" rolled products are referred to together as having a core) extending therethrough. The cores 14 may each define a longitudinal axis, L, of the rolled products 12. When the rolled products 12 are positioned in the first configuration (FIG. 1), the longitudinal axis of each rolled product 12 may extend generally parallel to the direction of transport (indicated by arrow M) of the rolled product 12 on the V-shaped conveying mechanism 10. Stated another way, the longitudinal axis of each rolled product 12 may extend generally parallel to a surface of a conveyor 16 or 18 on which the rolled product 12 is positioned. When the rolled products 12 are positioned in the second configuration (FIG. 2), the longitudinal axis of each rolled product 12 may extend generally perpendicular to the direction of transport (indicated by arrow M) of the rolled product 12 on the V-shaped conveying mechanism 10. Stated another way, the longitudinal axis of each rolled product 12 may extend generally perpendicular to a surface of a conveyor 16 or 18 on which the rolled product 12 is positioned.

In some embodiments, again referring to FIGS. 1 and 2, the V-shaped conveying mechanisms 10 of the present disclosure may each comprise a first conveyor 16 and a second conveyor 18. Each of the conveyors 16 and 18 may comprise an endless belt 20 traveling around a set of rollers 22. At least one of the rollers 22 may be driven by an actuator or other device such that the endless belt 20 rotates about the rollers 22. In other embodiments, the conveyors may instead comprise rollers, chains, air conveyors, vacuum conveyors, pushers used to convey product across dead plates, and/or other conveying devices known to those of skill in the art.

In some embodiments, the V-shaped conveying mechanisms 10 of the present disclosure may comprise a single conveyor or more than two conveyors, for example. If a single conveyor is provided, it may comprise one endless belt surrounding V-shaped rollers or other V-shaped supporting mechanisms such that the endless belt has no opening in the vertex of the "V". Although not illustrated, this single endless belt embodiment may apply throughout the disclosure.

An angle "A" may be formed between the first conveyor 16 and the second conveyor 18 or at the point of a single conveyor. The angle A may not necessarily have, but may have, a bisector in a vertical orientation. The angle may be in the range of about 40 degrees to about 75 degrees, specifically reciting all 0.5 degree increments within the specified range. The angle may also be about 90 degrees, about 120 degrees, between about 60 degrees and about 160 degrees, between about 80 degrees and about 150 degrees, between about 85 degrees and about 125 degrees, and/or between about 90 degrees and about 120 degrees, specifically reciting all 0.5 degree increments within the specified ranges. The angle A can be intersected by an imaginary line 17 originating between the first conveyor 16 and the second conveyor 18 and extending substantially perpendicular to a flat horizontal surface, such as a floor of a process module or manufacturing facility. The total of angle A is the sum of angle θ and angle α. The angle θ can be greater than, less than, or equal to the angle α. In one example embodiment, the first conveyor 16 and the second conveyor 18 can be fed by two different robots or other loading means, which can allow for angle θ to be substantially equal to angle α to aid in loading. Further, in another example embodiment, the first conveyor 16 and the second conveyor 18 can be fed by the same robot or other loading means, which can cause loading to be easier and more efficient when angle θ is less than angle α, or vice versa. Further to the above, the first conveyor 16 and the second conveyor 18 can be placed at any orientation with respect to a horizontal floor surface sufficient for loading one or more products.

Figures 3, 4:
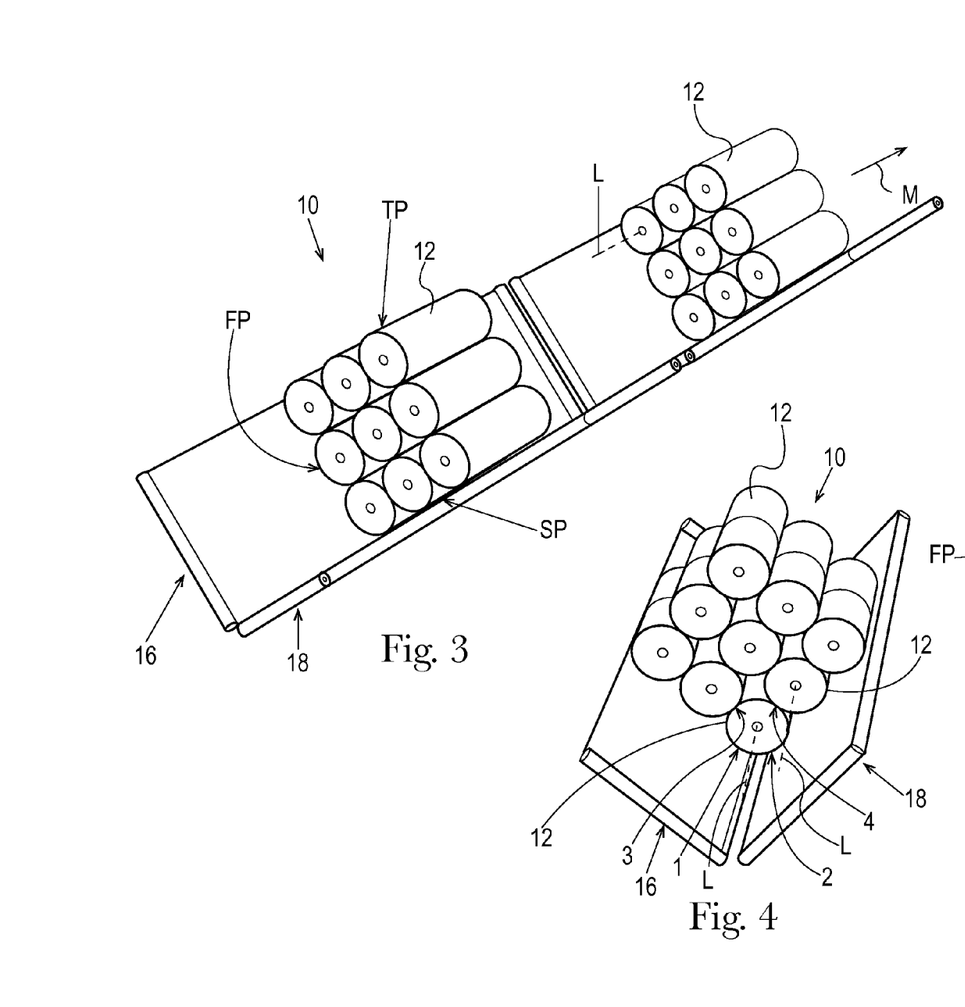
FIG. 3 is a perspective view of a V-shaped conveying mechanism having a plurality of rolls of paper towels positioned thereon in a first configuration in accordance with a non-limiting embodiment.
FIGS. 4 and 5 are perspective views of V-shaped conveying mechanisms having a plurality of rolls of toilet tissue positioned thereon a first configuration in accordance with some non-limiting embodiments.

In some embodiments, referring to FIGS. 1 and 4, for example, the first conveyor 16 may define a first axis, FA, extending in a direction generally perpendicular to the direction of movement, M, of a group or stack of the rolled products 12 on the V-shaped conveying mechanism 10. The second conveyor 18 may define a second axis, SA, extending in a direction generally perpendicular to the direction of movement, M, of the group of the rolled products 12 on the V-shaped conveying mechanism 10. The first axis, FA, may extend in a direction that is perpendicular or transverse to the direction of extension of the second axis, SA. In some embodiments, a first portion 1 of a first rolled product 12 may be engaged with the first conveyor 16 and a second portion 2 of the first rolled product 12 may be engaged with the second conveyor 18. A second rolled product 12 also positioned within the V-shaped conveying mechanism 10 may be engaged with a third portion 3 of the first rolled product 12 and with the first conveyor 16 or the second conveyor 18. If the second rolled product 12 is engaged with the first conveyor 16 and the third portion 3, a third rolled product 12 may be engaged with a fourth portion 4 of the first rolled product 12 and with the second conveyor 18 (see FIG. 4). Additional rolled products 12 may also be provided in or positioned in the V-shaped conveying mechanism 10 as detailed herein. The additional products may be stacked on the first, second, or third rolled products 12.

Figure 5:
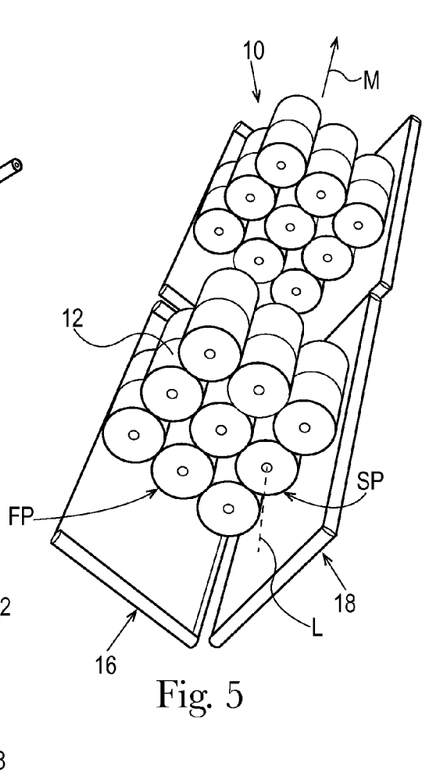

In some embodiments, referring to FIGS. 3-5, a plurality of rolled products 12 are illustrated stacked or grouped on the V-shaped conveying mechanisms 10. The rolled products 12 are in the first configuration in FIGS. 3-5 with their longitudinal axis, L, positioned generally parallel with a surface of the conveyors 16 and/or 18 and generally parallel with the direction of movement, M, of the V-shaped conveying mechanisms 10. The rolled products 12 in FIG. 3 are rolls of paper towels or shop towels and the rolled products 12 in FIGS. 4 and 5 are rolls of toilet tissues.

In some embodiments, referring again to FIGS. 3-5, as an example, a plurality of the rolled products 12 may positioned on the V-shaped conveying mechanism 10 in a configuration such that a first portion, FP, of the plurality of rolled products 12 engages a first side or first conveyor 16 of the V-shaped conveying mechanism 10, and such that a second portion, SP, of the plurality of rolled products 12 engages a second side or second conveyor 18 of the V-shaped conveying mechanism 10. A plurality of additional rolled products 12 or a third portion, TP, may be positioned generally on top of the first portion, FP, of the plurality of rolled products 12, and generally on top of the second portion, SP, of the plurality of rolled products 12 to form a stack or group of rolled products on the V-shaped conveying mechanism 10. The third portion, TP, of the plurality of rolled products 12 may be supported by the first portion, FP, and the second portion, SP, of the plurality of rolled products 12 and may not contact the first side 16 or the second side 18 of the V-shaped conveying mechanism 10. Any suitable number of rolled products 12 may be sequentially positioned on the V-shaped conveying mechanism 10 to achieve a number of rows, columns, and/or layers desired for a final package of the rolled products. 12

Figure 6:
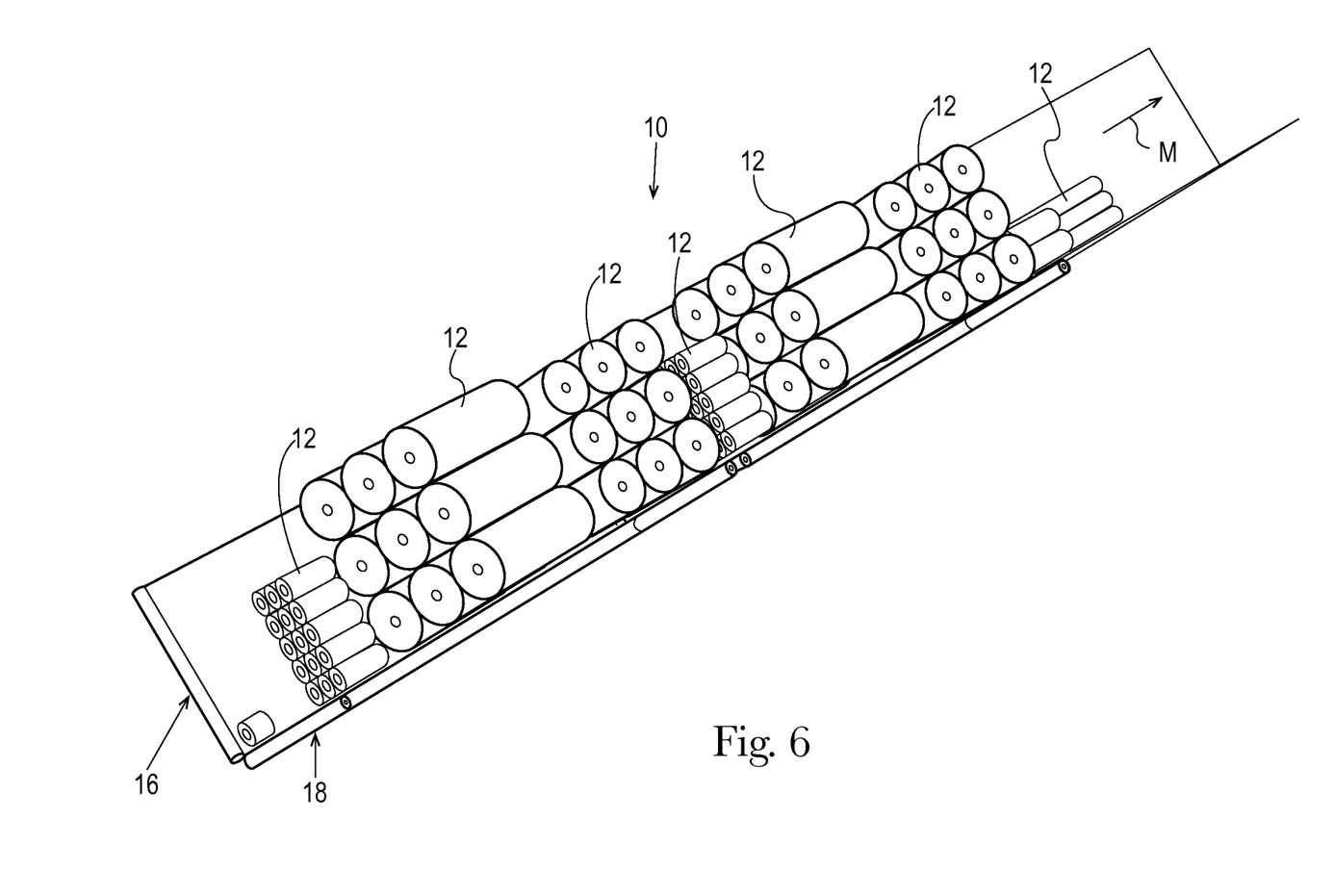
FIG. 6 is a perspective view of a V-shaped conveying mechanism with a plurality of different rolled products positioned thereon, wherein the plurality of different rolled products are positioned in a first configuration and in a second configuration in accordance with a non-limiting embodiment.

In an embodiment, referring to FIG. 6, a plurality of rolled products 12 are positioned on a V-shaped conveying mechanism 10. The rolled products 12 are illustrated positioned in both of the first configuration and the second configuration to show the versatility of the V-shaped conveying mechanism 10 and its uses. The rolled products 12 in FIG. 6 illustrate different types of rolled products 12 positioned on the V-shaped conveying mechanism 10, again merely as an example.

Figures 7, 8:
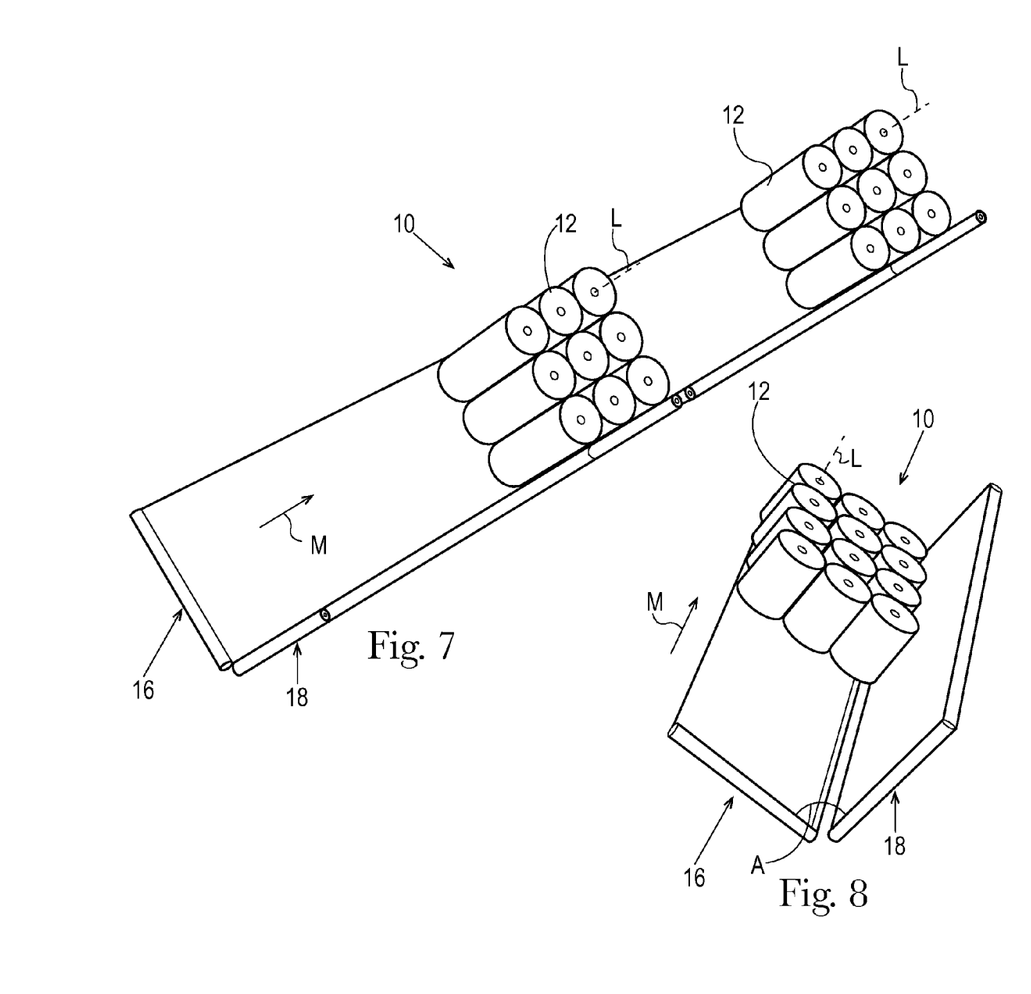
FIG. 7 is a perspective view of a V-shaped conveying mechanism having a plurality of rolls of paper towels positioned thereon in a second configuration in accordance with a non-limiting embodiment.
FIGS. 8 and 9 are perspective views of a V-shaped conveying mechanism having a plurality of rolls of toilet tissue positioned thereon in a second configuration in accordance with some non-limiting embodiments.
Figure 9:
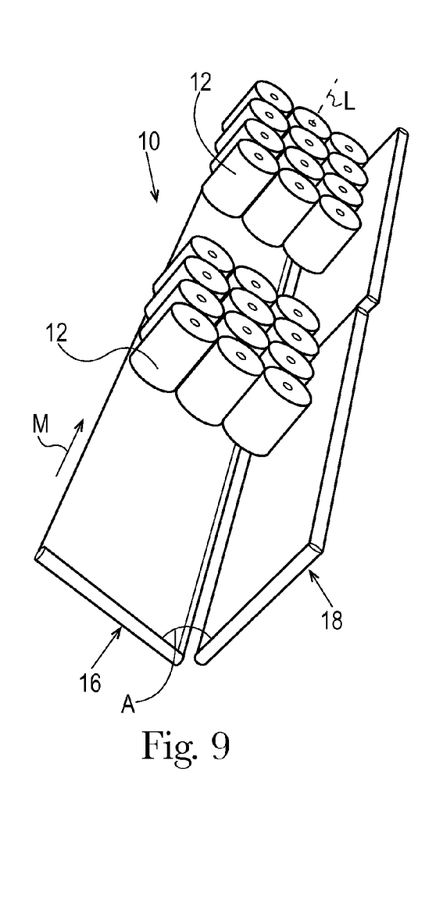

In an embodiment, referring to FIG. 7, the V-shaped conveying mechanism 10 is illustrated with rolls of paper towels or shop towels 12 positioned thereon in a group. The paper towels or shop towels 12 are illustrated in the second configuration with longitudinal axes, L, thereof positioned generally perpendicular to a surface of one of the conveyors 16 and 18 and generally perpendicular to the direction of movement, M, of the V-shaped conveying mechanism 10. FIGS. 8 and 9 illustrate rolled toilet tissue products 12 positioned on the V-shaped conveying mechanisms 10 in the second configuration.

Figure 10:
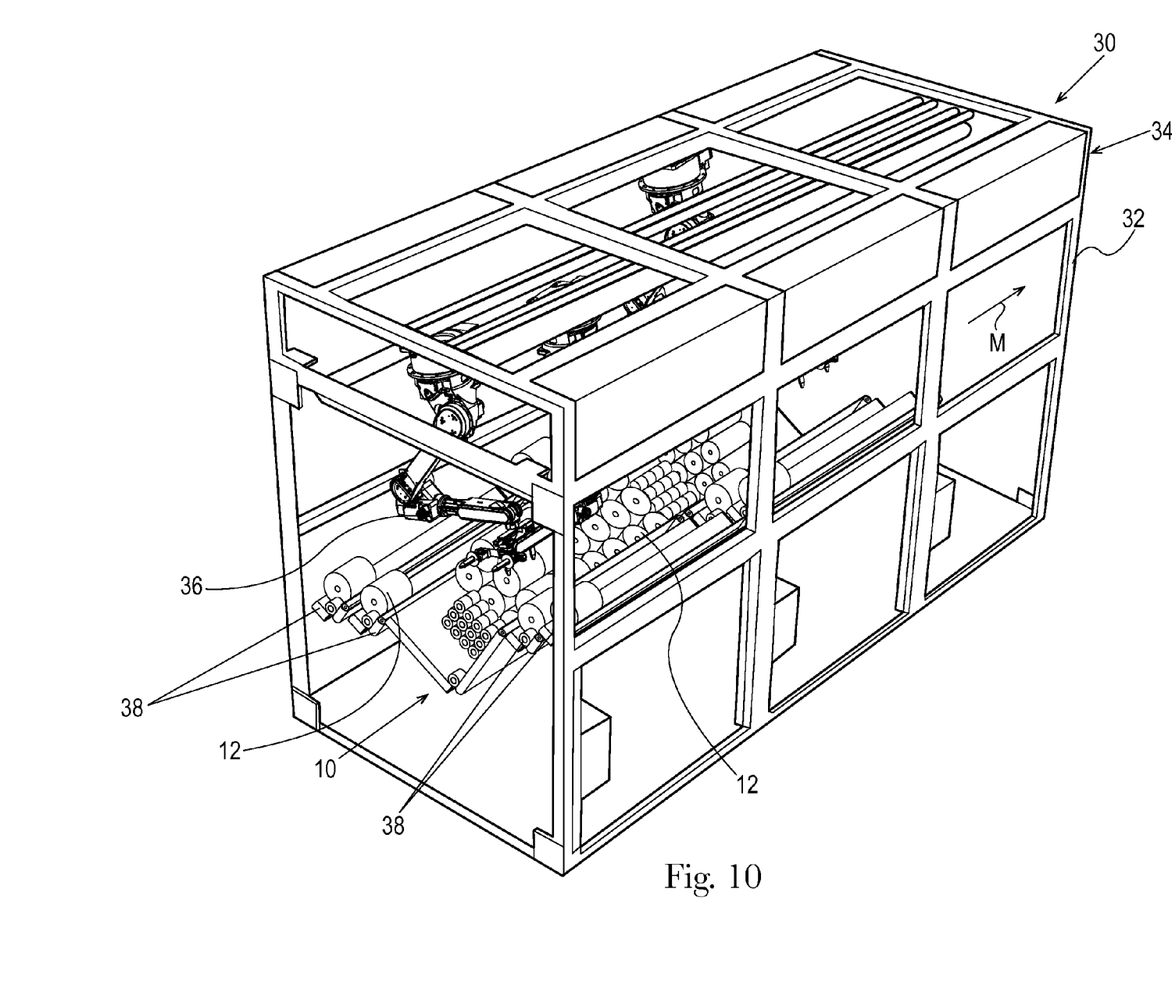
FIG. 10 is a perspective view of a process module comprising a V-shaped conveying mechanism in accordance with a non-limiting embodiment.
Figure 11:
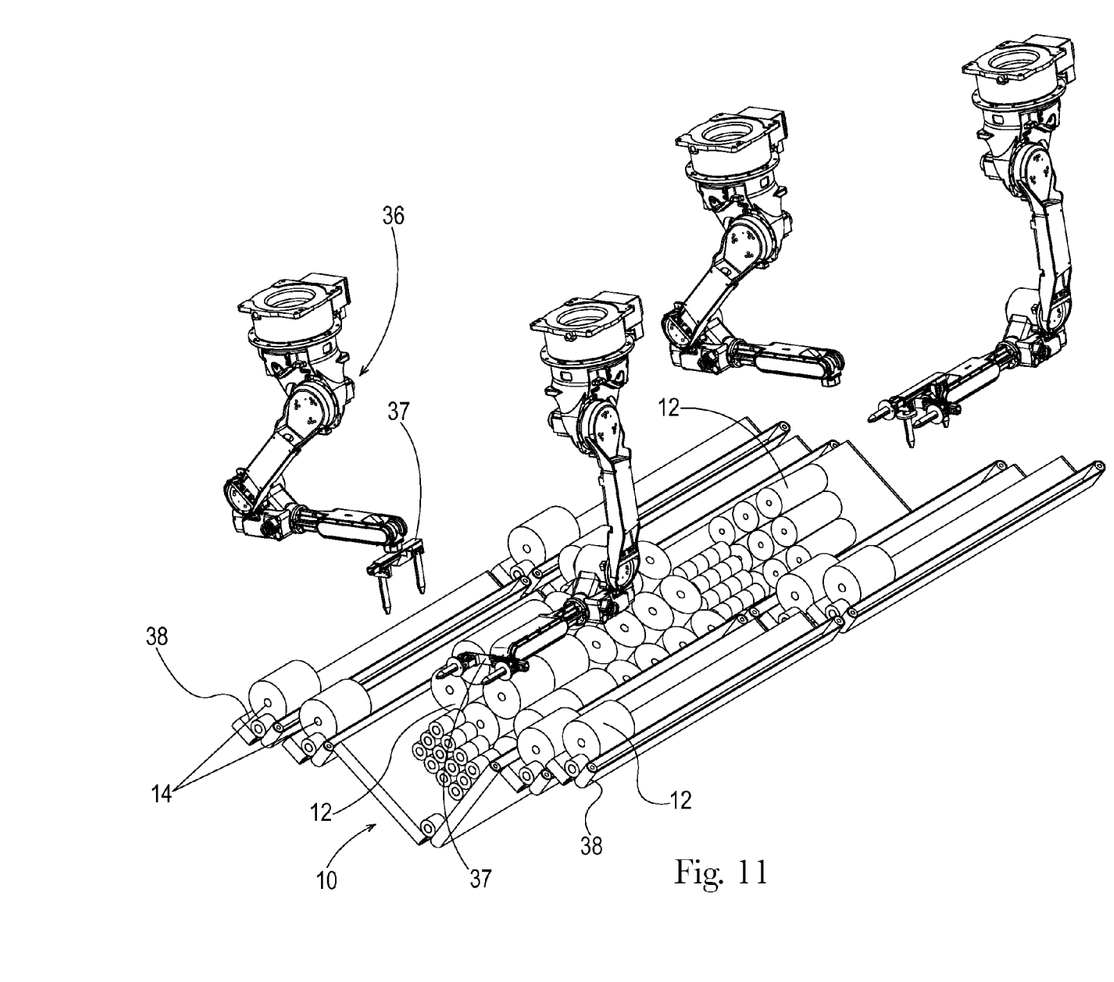
FIG. 11 is a perspective view of the V-shaped conveying mechanism and associated robots positioned within the process module of FIG. 10 in accordance with a non-limiting embodiment, the rolled products are illustrated in the first configuration and in the second configuration and have different sizes.

In an embodiment, referring to FIG. 10, a process module 30 is illustrated. The process module 30 may comprise a frame 32, a control panel and utilities portion 34, and a V-shaped conveying mechanism 10 of the present disclosure. The process module 30 may also comprise a positioning system, such as one or more robots 36 or automated positioning devices configured to position the rolled products 12 being fed into the process module 30 via input lanes 38 on the V-shaped conveying mechanism 10. The robots 36 may be configured to provide one or more positioning maneuvers to the rolled products 12. The process module 30 may also comprise other features, such as actuators, safety features or doors, wiring, communications systems, control systems, and/or lighting, for example, known to those of skill in the art. Referring to FIG. 11, the V-shaped conveying mechanism 10, the positioning system, and the input lanes 38 are illustrated outside of the process module 30 for clarity in illustration. The example robots 36 of the positioning system may comprise a picker device 37 configured to engage a core 14 in a rolled product 12 traveling on one of the input lanes 38 to pick up the rolled product 12 and position it on or in the V-shaped conveying mechanism 10. In other embodiments, the robots 36 may be configured to engage outer surfaces of the rolled products 12. Various rolled product 12 is illustrated on the V-shaped conveying mechanism 10 in FIG. 11 merely for example illustration. The input lanes 38 may be formed of a V-shaped conveying mechanism or other conveying mechanism to maintain control of the rolled products 12 as they are fed into the process module 30. The V-shaped conveying mechanism 10 may be used in any other manufacturing or packaging operations that do not include a process module 30.

Figure 12:
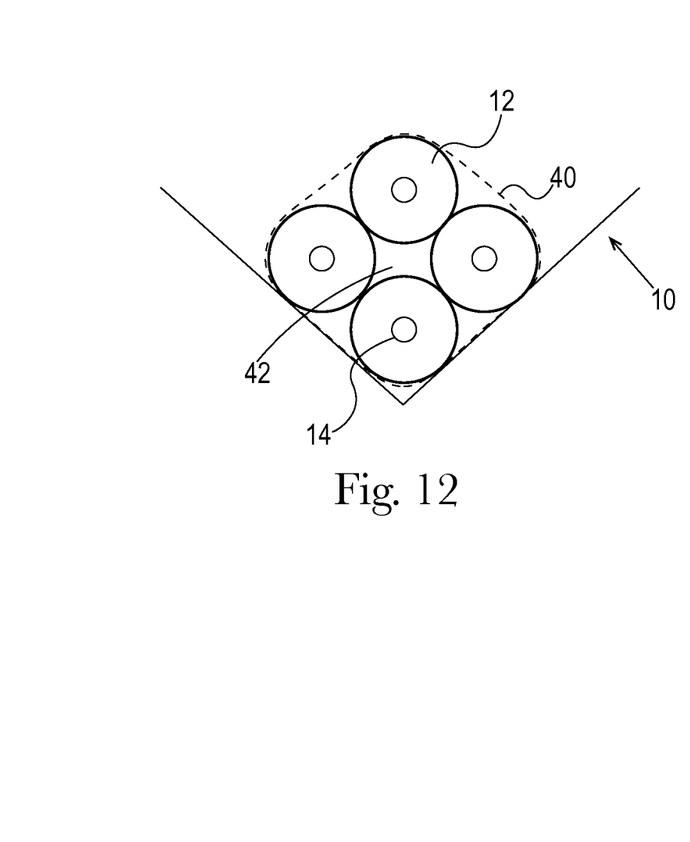
FIG. 12 is a schematic illustration of a package configuration produced using the V-shaped conveying mechanism of the present disclosure in accordance with a non-limiting embodiment.
Figure 13:
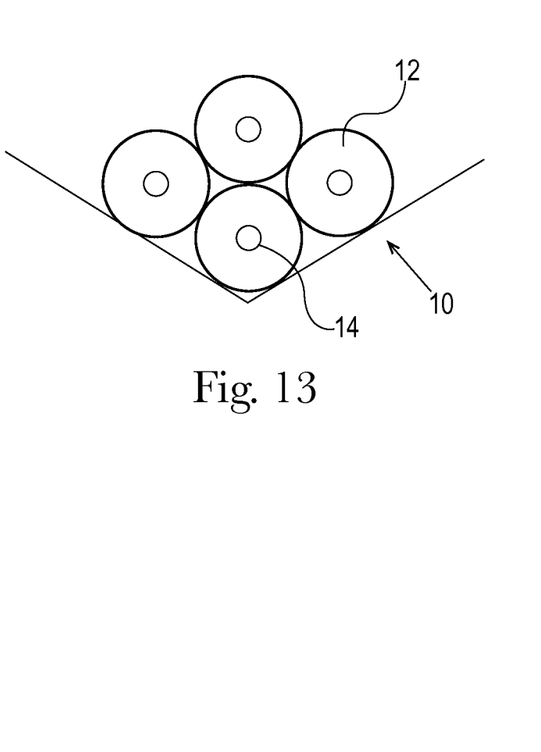
FIG. 13 is a schematic illustration of a package configuration produced using the V-shaped conveying mechanism of the present disclosure in accordance with a non-limiting embodiment.
Figures 14, 15, 16:
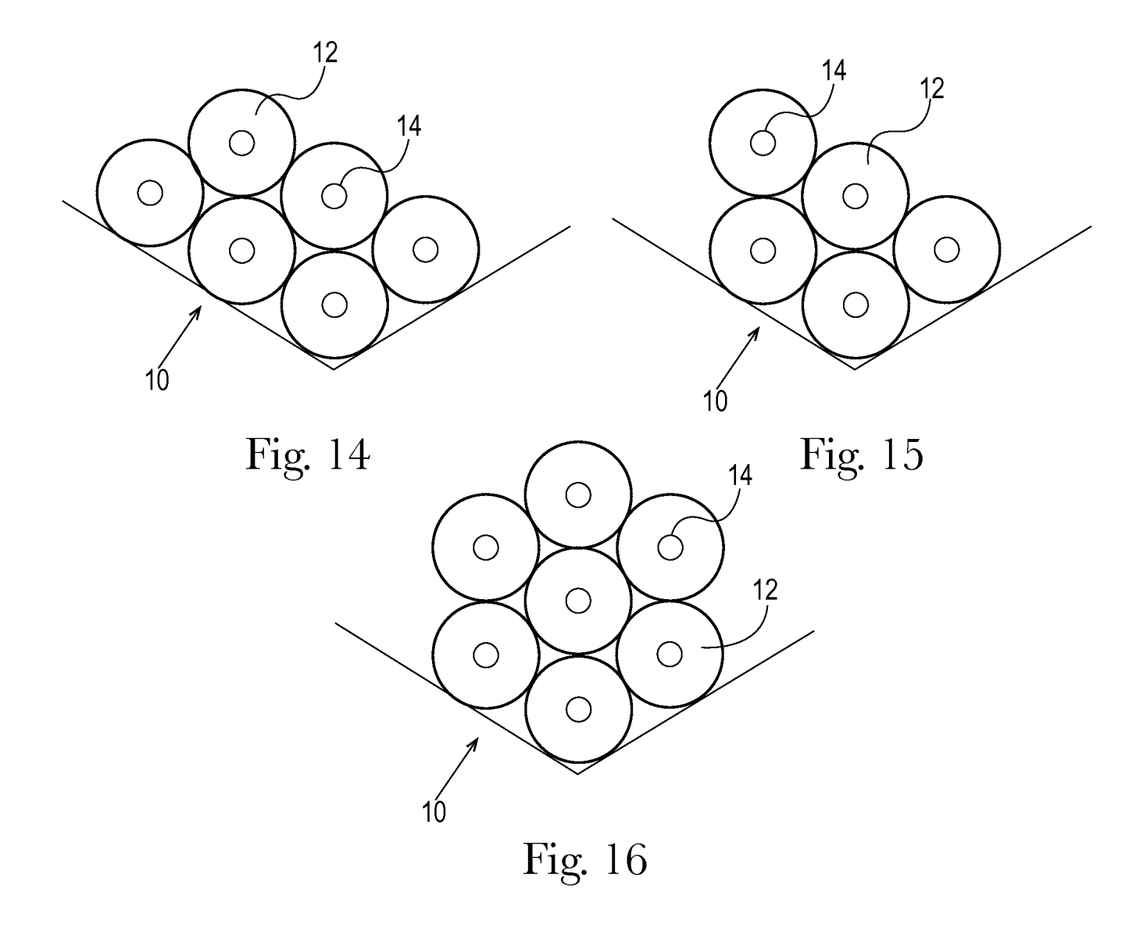
FIG. 14 is a schematic illustration of a package configuration produced using the V-shaped conveying mechanism of the present disclosure in accordance with a non-limiting embodiment.
FIG. 15 is a schematic illustration of a package configuration produced using the V-shaped conveying mechanism of the present disclosure in accordance with a non-limiting embodiment.
FIG. 16 is a schematic illustration of a package configuration produced using the V-shaped conveying mechanism of the present disclosure in accordance with a non-limiting embodiment.

In some embodiments, referring to FIGS. 12-16, a number of package configurations of rolled products or other products may be created using the V-shaped conveying mechanism 10 of the present disclosure. The package configurations may have any suitable depth. FIG. 12 illustrates a square-like shaped configuration of rolled products 12 on a V-shaped conveying mechanism 10. FIG. 13 illustrates a diamond-like shaped configuration of rolled products 12 on a V-shaped conveying mechanism 10. FIG. 14 illustrates a parallelogram-like shaped configuration of rolled products 12 on a V-shaped conveying mechanism 10. FIG. 15 illustrates a trapezoidal-like shaped configuration of rolled products 12 on a V-shaped conveying mechanism 10. FIG. 16 illustrates a pentagonal-like shaped configuration of rolled products 12 on a V-shaped conveying mechanism 10. In FIGS. 12-16, the rolled products 12 are positioned in the first configuration with their cores 14 defining longitudinal axes extending into and out of the page. The rolled products 12 may be conveyed by the V-shaped conveying mechanism 10 into a packaging operation, such as a bundler or a packaging unit configured to apply a film or other material wrapper around, or at least partially around, the rolled products 10 and form a package of rolled products. As such, the packages may comprise a plurality of rolled products 10 wrapped in a film wrapper. The packages may a plurality of side walls. At least one of the side walls, and likely two of the side walls, may comprise the shapes illustrated in FIGS. 12-16. A film wrapper 40 is illustrated in dash in FIG. 12, for example. It will be understood that film wrappers 40 may surround all of the rolled products in FIGS. 13-16, although not illustrated.

Figure 17:
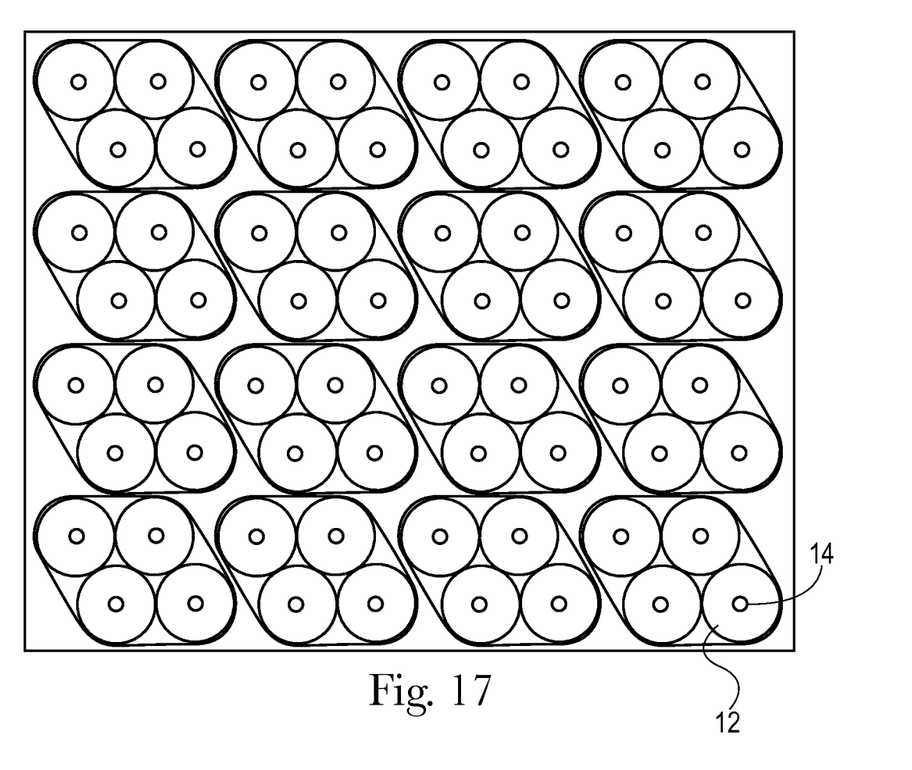
FIG. 17 is a top view of an example pallet configuration for the package of rolled products of FIG. 13 in accordance with a non-limiting embodiment.

In some embodiments, referring again to FIGS. 12-16, the rolled products 12 may be stacked on each other and/or positioned beside each other as illustrated. The rolled products 12 may form a central gap 42, as illustrated in FIG. 12, or may have a central top rolled product contacting three other rolled products 12, as illustrated in FIG. 13. The configuration of the rolled products 12 illustrated in FIG. 13 may have about an 11 percent or 8 to 13 percent volume reduction in a package of rolled products 12 as the configuration of the rolled products 12 illustrated in FIG. 12. This may save space on a shipping truck or other vehicle or on a pallet. Pallet efficiency and, thus, shipping cost is particularly important for low density products, such as paper towels and/or toilet tissue, for example. A top view of an example pallet fit of a package (see FIG. 13) produced by the V-shaped conveying mechanism 10 of the present disclosure is illustrated in FIG. 17. This package orientation of rolled products 12 may take up less space on a pallet and, thereby, allow for more rolled products 12 to be positioned on a pallet.

In various embodiments, a package of rolled products or rolled paper products is provided by the present disclosure. The package may comprise a film or other material wrapper surrounding a plurality of rolled paper products. The package may also comprise at least one wall, such as a side wall, a bottom wall, or a top wall, for example, having a diamond-like shape, at least one wall having a parallelogram-like shape, at least one wall having a trapezoidal-like shape, or at least one wall having a pentagonal-like shape. The packages of the present disclosure may have a unique shelf appearance in a retail environment.

In various embodiments, a method of transporting rolled products is provided by the present disclosure. The method may comprise providing a V-shaped conveying mechanism, positioning a plurality of the rolled products on the V-shaped conveying mechanism such that a first portion of the plurality of the rolled products engages a first side or a first conveyor of the V-shaped conveying mechanism, and such that a second portion of the plurality of the rolled products engages a second side or a second conveyor of the V-shaped conveying mechanism. This is illustrated in FIGS. 3-5, for example. The positioning may be accomplished through the use of a positioning system, such as one or more robots 36, as discussed above. The positioning may comprise placing at least one rolled product on at least a portion of another rolled product.

In various embodiments, a method of transporting rolled products is provided by the present disclosure. The method may comprise providing a V-shaped conveying mechanism, positioning a plurality of the rolled products on the V-shaped conveying mechanism in a group or a stack, and transporting the group or stack of the plurality of the rolled products between a first position or location and a second position or location using the V-shaped conveying mechanism. The plurality of rolled products may comprise rolls of paper towels, shop towels, and/or toilet tissue. Each rolled product may have a core extending therethrough and defining a longitudinal axis of the rolled product. The positioning step may comprise placing the rolled products on the V-shaped conveying mechanism with the longitudinal axis of each core in a direction generally parallel to the direction of transport or movement between the first position and the second position or with the longitudinal axis of each core in a direction generally perpendicular to the direction of transport or movement between the first position and the second position. As discussed above, the V-shaped conveying mechanism may comprise a first conveyor and a second conveyor. The positioning step may comprise placing at least one rolled product on at least a portion of another rolled product. The method may be a start-stop (batch) process or a continuous process.

In various embodiments, a method of transporting rolled products is provided by the present disclosure. The method may comprise providing a conveying mechanism comprising a first conveyor and a second conveyor or may comprise providing a single V-shaped conveyor having a first portion and a second portion. The first conveyor or portion defines a first axis extending in a direction generally perpendicular to the direction of movement of the group of the rolled products on the conveying mechanism. The second conveyor or portion defines a second axis extending in a direction generally perpendicular to the direction of movement of the group of the rolled products on the conveying mechanism. The first axis may extend in a direction that is transverse or perpendicular to the direction of extension of the second axis. The method may further comprise engaging a first portion of a first rolled product with the first conveyor or portion, engaging a second portion of the first rolled product with the second conveyor or portion, and engaging a second rolled product with a third portion of the first rolled product and with the first conveyor or portion or the second conveyor or portion. In an embodiment, the second rolled product may be engaged with the first conveyor. In such an embodiment, the method may comprise engaging a third rolled product with a fourth portion of the first rolled product and with the second conveyor or portion. Each of the rolled products may define a core. A longitudinal axis of each core may be positioned generally parallel with or perpendicular to the direction of movement of the conveying mechanism.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications may be made without departing from the spirit and scope of the present disclosure. It is therefore intended to cover in the appended claims all such changes and modifications that are within the scope of this disclosure.

What is claimed is:

1. A method of transporting rolled products, the method comprising:
   providing a V-shaped conveying mechanism; and
   positioning a plurality of the rolled products on the V-shaped conveying mechanism such that a first portion of the plurality of the rolled products engages a first side of the V-shaped conveying mechanism, and such that a second portion of the plurality of the rolled products engages a second side of the V-shaped conveying mechanism, wherein the positioning step is accomplished through the use of one or more robots configured to provide one or more positioning maneuvers.

2. The method of claim 1, wherein the rolled products are rolls of paper towels or toilet tissue.

3. The method of claim 1, wherein the V-shaped conveying mechanism comprises a first conveyor and a second conveyor.

4. The method of claim 1, wherein the positioning comprises placing at least one rolled product on at least another rolled product using at least one of a batch process and a continuous process.

5. A method of transporting rolled products, the method comprising:
   providing a V-shaped conveying mechanism;
   positioning a plurality of the rolled products on the V-shaped conveying mechanism in a group; and
   transporting the group of the plurality of the rolled products between a first position and a second position using the V-shaped conveying mechanism,
   wherein each rolled product has a core extending therethrough and defining a longitudinal axis of the rolled product, and wherein the positioning step comprises placing the rolled products on the V-shaped conveying mechanism with the longitudinal axis of each core in a direction generally perpendicular to the direction of transport between the first position and the second position.

6. The method of claim 5, wherein the plurality of the rolled products comprise rolls of paper towel or rolls of toilet tissue.

7. The method of claim 5, wherein the V-shaped conveying mechanism comprises a first conveyor and a second conveyor.

8. The method of claim 5, wherein the positioning comprises placing at least one rolled product on at least another rolled product.

9. A method of transporting a group of rolled products, the method comprising:
   providing a conveying mechanism comprising a first conveyor and a second conveyor, wherein the first conveyor defines a first axis extending in a direction generally perpendicular to a direction of movement of the group of the rolled products on the conveying mechanism, wherein the second conveyor defines a second axis extending in a direction generally perpendicular to the direction of movement of the group of the rolled products on the conveying mechanism, and wherein the first axis extends in a direction that is transverse to the direction of extension of the second axis;
   engaging a first portion of a first rolled product with the first conveyor;
   engaging a second portion of the first rolled product with the second conveyor; and
   engaging a second rolled product with a third portion of the first rolled product and with the first conveyor or the second conveyor,
   wherein each rolled product defines a core, and wherein a longitudinal axis of each core is positioned generally perpendicular with the direction of movement of the conveying mechanism.

10. The method claim 9, wherein an angle A between the first conveyor and the second conveyor is between about 60 degrees and about 160 degrees.

11. The method of claim 10, wherein the angle A is between about 80 degrees and about 150 degrees.

12. The method of claim 11, wherein the angle A is between about 85 degrees and about 125 degrees.

13. The method claim 9, wherein an angle A between the first conveyor and the second conveyor is about 90 degrees or about 120 degrees.

14. The method of claim 9, wherein the second rolled product is engaged with the first conveyor, the method comprising engaging a third rolled product with a fourth portion of the first rolled product and with the second conveyor.

\* \* \* \* \*